(12) United States Patent
Eckert et al.

(10) Patent No.: US 6,283,500 B1
(45) Date of Patent: Sep. 4, 2001

(54) AIR BAG FOR AN AIRBAG UNIT (75) Inventors: Nick Eckert, Berlin; Carston Haase, Bielefeld; Jens Schlönvoigt, Berlin, all of (DE)

(73) Assignee: Petri AG (DE)

( * ) Notice: Subject to any disclaimer, the term of this patent is extended or adjusted under 35 U.S.C. 154(b) by 0 days.

(21) Appl. No.: 09/581,755
(22) PCT Filed: Dec. 14, 1998
(86) PCT No.: PCT/DE98/03762
§ 371 Date: Jun. 14, 2000
§ 102(e) Date: Jun. 14, 2000
(87) PCT Pub. No.: WO99/30933
PCT Pub. Date: Jun. 24, 1999

(30) Foreign Application Priority Data

Dec. 15, 1997 (DE) .............................. 197 57 410

(51) Int. Cl.[7] .......................... B60R 21/22; B60R 21/16; B60R 21/24
(52) U.S. Cl. .................. 280/730.1; 280/732; 280/743.1; 280/729
(58) Field of Search ............... 280/728.1, 730.1, 280/730.2, 732, 743.1, 729

(56) References Cited

U.S. PATENT DOCUMENTS

| | | | |
|---|---|---|---|
| 3,476,402 | * 11/1969 | Wilfert | 280/729 |
| 3,642,303 | * 2/1972 | Irish et al. | 280/730.1 |
| 3,733,088 | 5/1973 | Stephenson | 280/150 |
| 3,752,501 | * 8/1973 | Daniel et al. | 280/729 |
| 3,768,830 | * 10/1973 | Hass | 280/730.1 |
| 3,774,936 | 11/1973 | Barnett et al. | 280/150 |
| 4,290,627 | * 9/1981 | Cumming et al. | 280/729 |
| 5,240,283 | * 8/1993 | Kishi et al. | 280/729 |
| 5,333,899 | 8/1994 | Witte | 280/730 |
| 5,480,184 | * 1/1996 | Young | 280/729 |
| 5,529,337 | * 6/1996 | Takeda et al. | 280/729 |
| 5,556,128 | 9/1996 | Sinnhuber et al. | 280/730.2 |
| 5,577,765 | * 11/1996 | Takeda et al. | 280/729 |
| 5,602,734 | 2/1997 | Kithil | 364/424.055 |
| 5,934,701 | * 8/1999 | Furukawa | 280/730.1 |

FOREIGN PATENT DOCUMENTS

| | | |
|---|---|---|
| 38 33 889 | 4/1990 | (DE) . |
| 43 04 152 | 8/1993 | (DE) . |
| 44 34 036 | 3/1996 | (DE) . |
| 195 41 513 | 5/1996 | (DE) . |
| 195 29 829 | 10/1996 | (DE) . |
| 195 46 143 | 6/1997 | (DE) . |
| WO 93/16902 | 9/1993 | (WO) . |

* cited by examiner

*Primary Examiner*—Brian L. Johnson
*Assistant Examiner*—Joselynn Z. Sliteris
(74) *Attorney, Agent, or Firm*—Foley & Lardner (57) ABSTRACT

A gas bag for an airbag module having an outer contour and a plurality of sections, at least one of which is cut free of the remaining section of the gas bag and is able to move independently of it. The cut-free section is situated at least partly within the outer contour of the gas bag, and is of such a size and shape that the adjacent gas bag section constitutes a frame of the cut free section.

12 Claims, 10 Drawing Sheets

AIR BAG FOR AN AIRBAG UNIT

BACKGROUND OF THE INVENTION

The invention relates to a gas bag for an airbag module.

In order to adapt gas bags to different requirements, for example to be driver's, front-passenger's or side airbags, it is known to differ the shapes of the gas bags. While a driver's airbag generally has a symmetrical shape, asymmetrical shapes are known for front-passenger's airbags and flat asymmetrical shapes are known for side airbags. DE 195 41 513 A1, for example, discloses a side airbag which has a C-shaped contour. The restraint function of the airbag is thereby restricted in some areas to certain body parts whose support in the event of a crash is essential.

DE 44 34 036 A1 furthermore discloses a side airbag having a gas bag which has an upper and lower gas chamber, the upper gas chamber being larger than the lower one, so that, in the event of a side impact, the thorax and the head region are uniformly intercepted.

Finally, DE 195 46 143 A1 discloses a vehicle passenger restraint device in which a flexible inflated cushion acting as the side bag has the profile of a door with a window cutout. Therefore, in this design, a cutout is present within the outer contour of the side bag at a location at which the airbag is not wanted.

The gas bags mentioned have the disadvantage that when inflated they are restricted in their degrees of freedom by their connection to the gas generator. In spite of the adapted shape of the known gas bags, this may, in certain installation positions of an airbag module, have a negative effect on the passenger's kinematics. For example, for this reason gas bags cannot be mounted on the vehicle roof. If, because of its restricted degrees of freedom, the inflated gas bag cannot follow the movement sequence of the passenger, relative movements between the gas-bag fabric and the passenger occur. This results in grazes on the skin and in excessive loads on various body parts. For example, a fatal extension of the neck may occur.

SUMMARY OF THE INVENTION

The invention is based on the object of changing the gas bag in such a manner that it is able, after it is deployed, to follow the movement sequence of the passenger.

The gas bag according to the invention for an airbag module has at least one cut-free gas-bag section which is movable independently of the remaining gas-bag region and is situated at least partly within the outer contour of the gas bag. When inflated, this gas bag therefore does not constitute a self-contained body, but rather it has at least one section which is cut free and is movable independently of the remaining gas bag. This section is therefore able to follow the movements of the passenger in the event of a crash, and so relative movements between this section of the gas bag and the occupant are avoided to the greatest possible extent.

In a first embodiment, the cut-free gas-bag section is provided in that gas-bag region which in the deployed gas bag is assigned to the head of the passenger.

This embodiment is particularly expedient for a gas bag which is deployed from the roof of the vehicle. If the head of the passenger strikes against the cut-free section of the gas bag, this section can then follow the movement of the head, and so a relative movement between the two is avoided.

In a second embodiment, the cut-free gas-bag section is situated in the region of the connection of the gas bag to a gas generator. In this embodiment, the cut-free section of the gas bag is connected to the gas generator. This enables in particular the remaining region of the gas bag to be better adapted to the passenger.

The cut-free gas-bag section is preferably of such a size and shape that the adjacent gas-bag section constitutes a frame for the cut-free gas-bag section. Since the cut-free gas-bag section can move independently, it can be partially pressed out of this frame by the passenger.

In one embodiment, at least one cut runs in the form of a slot through opposite sides of the gas bag, and opposite slot edges of these sides are connected to each other in a gas-tight manner. In this embodiment, the opposite slot edges of the opposite sides are connected directly to each other, as a result of which the deployed gas bag has a constricted outer contour at the slot edges. However, it is also possible that between the opposite slot edges of the opposite sides there is provided at least one additional gas-bag part, and particularly of such a width that the gas bag, when deployed, has the profile of the outer contour of an unslotted gas bag even in the region of the slot.

It is expedient for the gas bag to be composed of an upper and a lower part, and for the two parts to have an identical slot profile.

Depending on the requirements, the slot may have a different profile. The slot preferably runs in a curved or angular manner and, in particular, in the shape of a U.

In one embodiment, the two ends of the slot are situated within the gas-bag outer contour. In a further refinement of this embodiment, two slots are situated opposite each other with their ends spaced apart.

In a further embodiment, at least one end of the slot penetrates the gas-bag outer contour, so that, when the cut-free gas-bag section is moved away, the outer contour of the gas bag is concomitantly moved away at this location.

It is expedient for the profile of the slot to at least partly correspond to the profile of the outer contour of the gas bag.

DESCRIPTION OF THE DRAWINGS

The invention will be explained in exemplary embodiments with reference to the drawings, in which.

DETAILED DESCRIPTION

Figure 1:
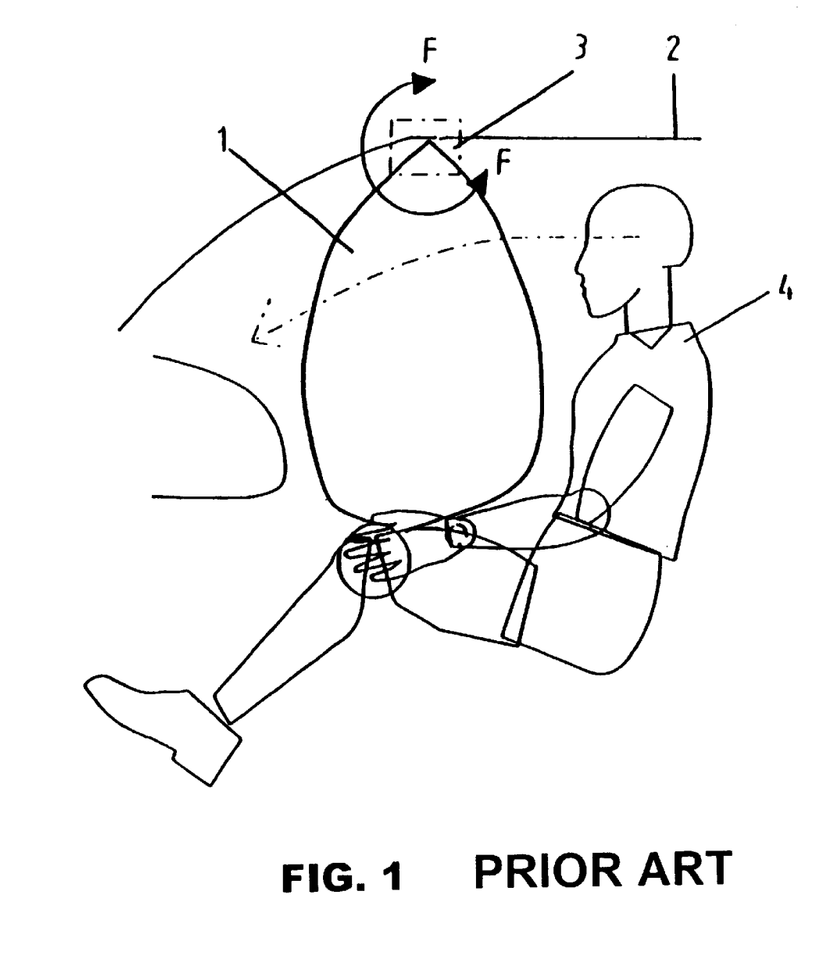
FIG. 1 shows a gas bag of known design and fastened to the roof of a vehicle, after it is deployed.
Figure 2:
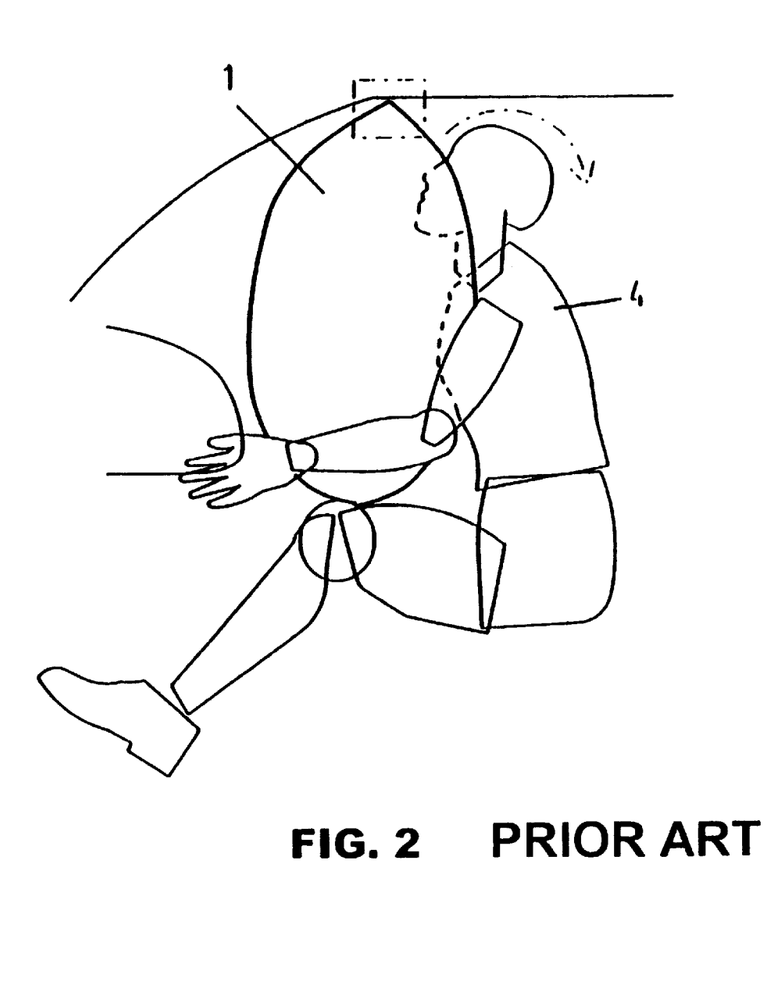
FIG. 2 shows the gas bag according to FIG. 1 after the impact of the passenger.

In FIG. 1, a gas bag 1 of conventional design is provided on a vehicle roof 2. In the deployed state illustrated, the gas bag extends downward from a gas generator 3. Because of its connection to the gas generator, it has the degrees of freedom identifiable by arrows F. As can be seen from FIG. 2, in the event of a crash the passenger 4 strikes against the deployed gas bag 1. Since during this process the latter is only able to move slightly in the direction of travel, the passenger penetrates into the gas bag, as can be seen from FIG. 2. However, because of the reaction forces which occur, the head, in particular, is then hurled to the rear again, which is shown clearly by the dash-dotted arrow above the head, so that a fatal extension of the neck may occur.

Figure 3:
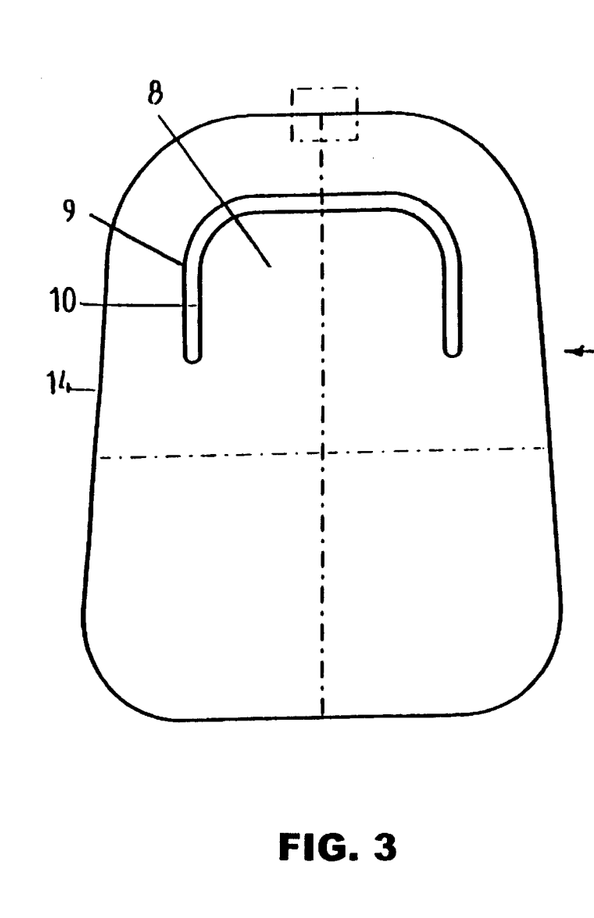
FIG. 3 shows the plan view of a gas bag which is not deployed and has a gas-bag section cut free in the shape of a U.
Figure 4:
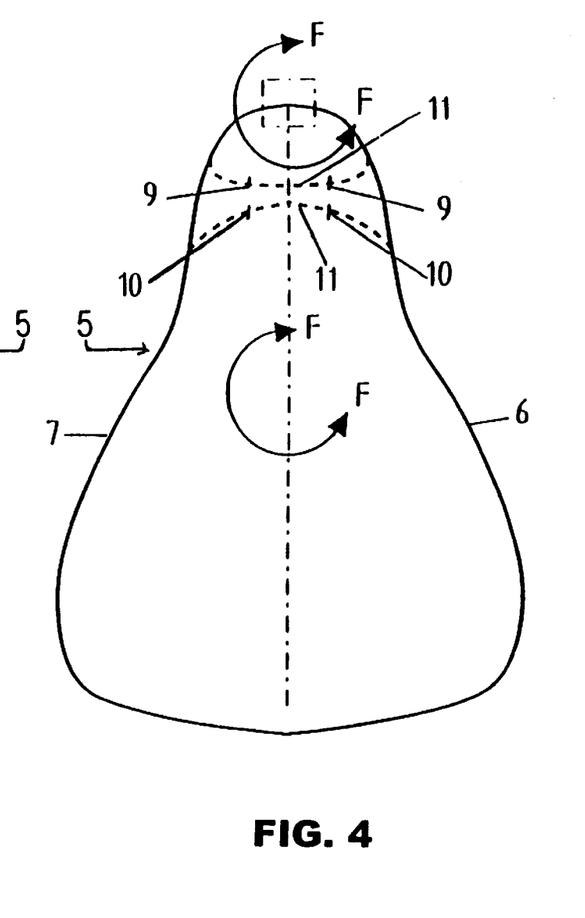
FIG. 4 shows the gas bag according to FIG. 3 in the side view in a deployed position.

In FIGS. 3 and 4, a gas bag 5 according to the invention is illustrated. Said gas bag consists of an upper plate 6 and a lower plate 7. There is a cut-free section 8 in both of the plates, the cut edges 9, 10 of the two plates being situated one above the other. As can be seen from FIG. 4, the opposite cut edges 9 and 10 of the opposite upper and lower plates, respectively, are connected to each other with the insertion of an additional gas-bag part 11. The arrows F are intended to clearly show that the cut-free section 8 and the remaining region of the gas bag can move separately from each other.

Figure 5:
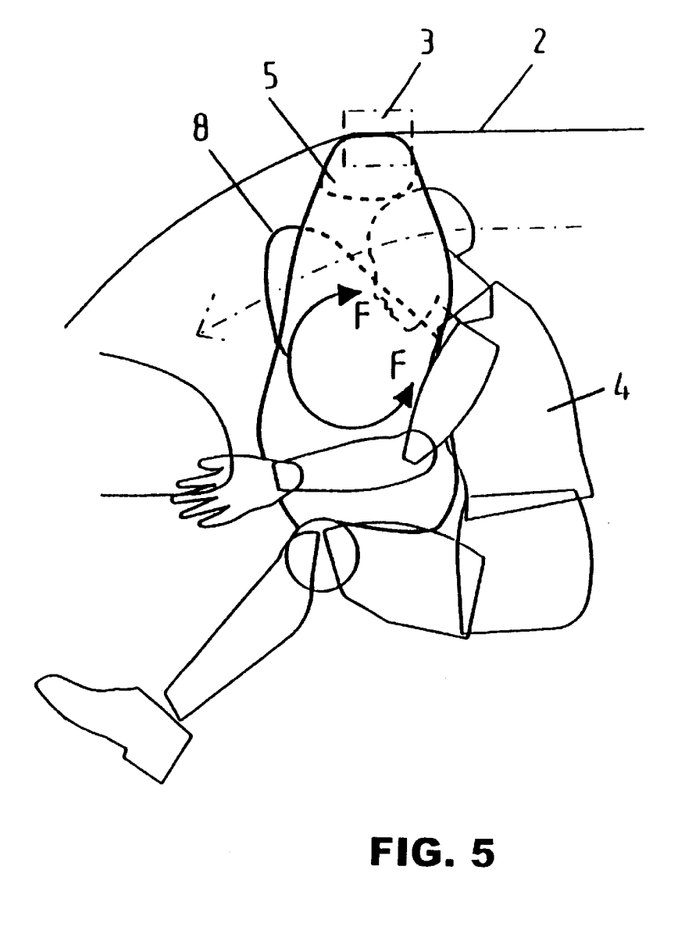
FIG. 5 shows a gas bag according to FIGS. 3 and 4 for protecting the head region after the impact of the passenger.

In FIG. 5, the functioning of the gas bag according to the invention and of FIGS. 3 and 4 in the event of a crash is illustrated. The gas bag 5 is fastened to the roof 2 of a vehicle and deploys downward from the gas generator 3. In the embodiment illustrated, the cut-free gas-bag section 8 is provided in the head region of the passenger 4. In the event of a crash, the head therefore strikes against this section. As can be seen from FIG. 5, said section in the process is moved forward, i.e. it moves in the same direction as the head. Relative movements between the head and this section are therefore at least reduced, so that grazes on the skin and, in particular, fatal extensions of the neck are avoided. The gas-bag construction according to the invention therefore makes it possible for the first time to attach the gas bag to the roof of the vehicle without there being the risk of the passenger being injured in the event of a crash because of this attachment. The attachment to the roof opens up the option of using a single design of the airbag module for the front-passenger's seat or for the rear seat. The multiplicity of types which have previously been required can be dispensed with.

Figure 6:
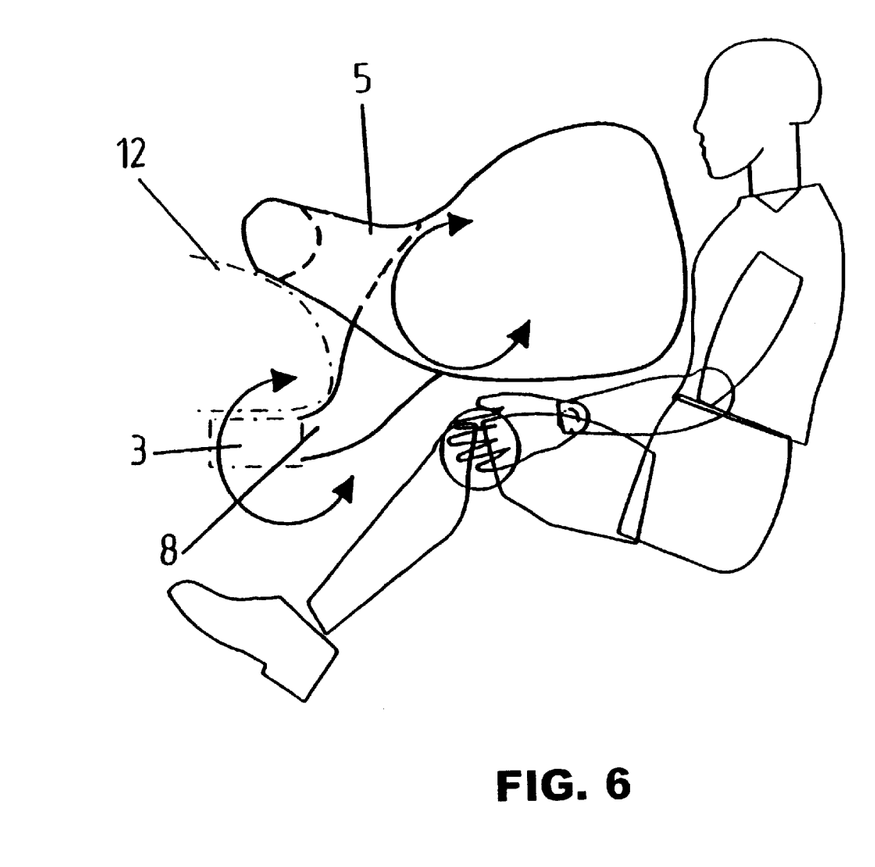
FIG. 6 shows the use of the gas bag according to FIGS. 3 and 4 with a connection to the gas generator below the dashboard.

However, the gas bag according to the invention also has advantages for the connections which are currently already customary. In FIG. 6, an embodiment is illustrated in which the gas generator 3 is attached below the instrument panel 12. In this case, the cut-free section 8 is connected to the gas generator. Since this section is movable independently of the remaining region of the gas bag 5, the deployed gas bag can, as illustrated in FIG. 6, also be substantially better adapted in this installation position to the passenger.

Figure 7:
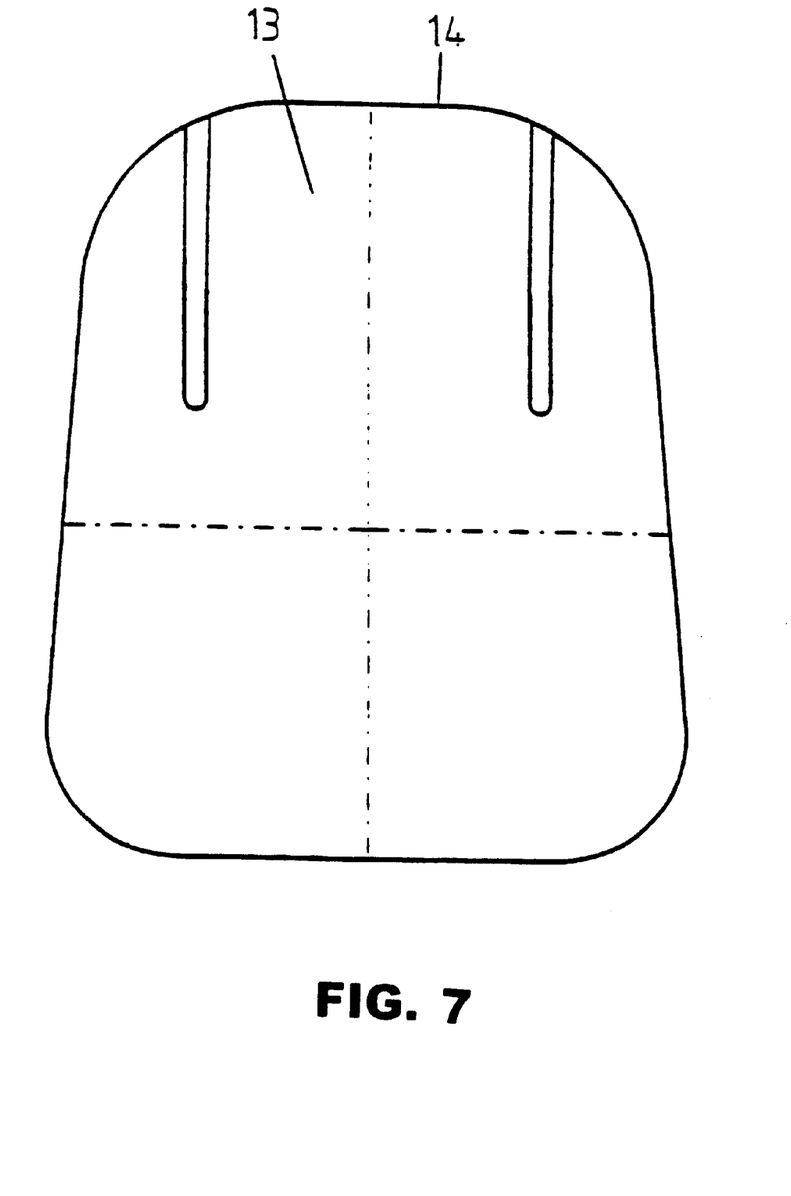
FIGS. 7–13 show different shapes of the cut-free gas-bag sections.

In FIGS. 7 to 13, different shapes of the cut-free gas-bag section are illustrated. In FIG. 7, a cut-free section 13 is illustrated which, in contrast to the embodiment illustrated previously, extends as far as the outer contour 14 of the gas bag, the slots penetrating the outer contour.

Figure 8:
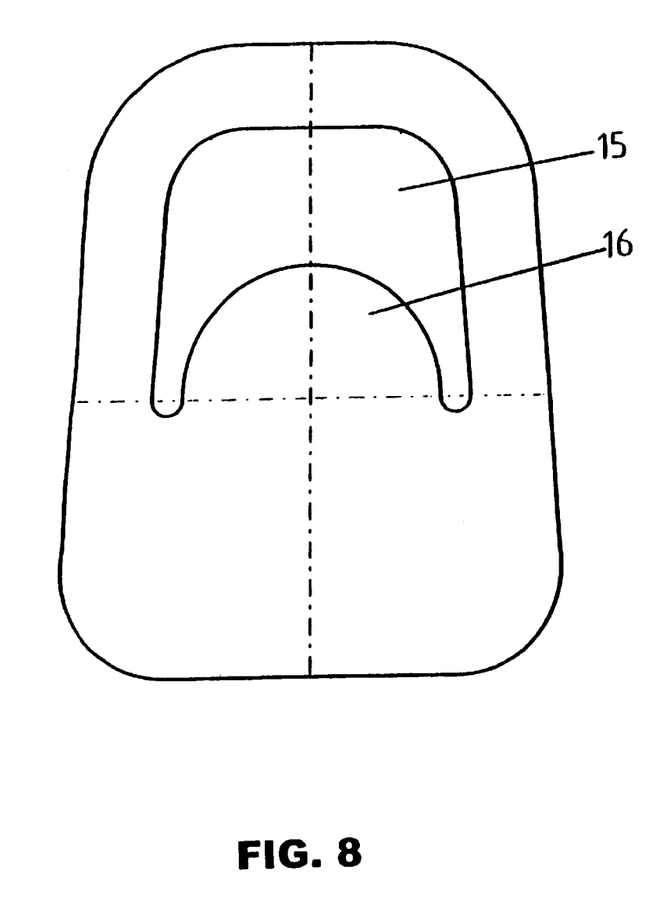

In the embodiment of FIG. 8 there is a relatively large cut 15, which means that the cut-free section 16 is smaller than in the previous embodiments.

Figure 9:
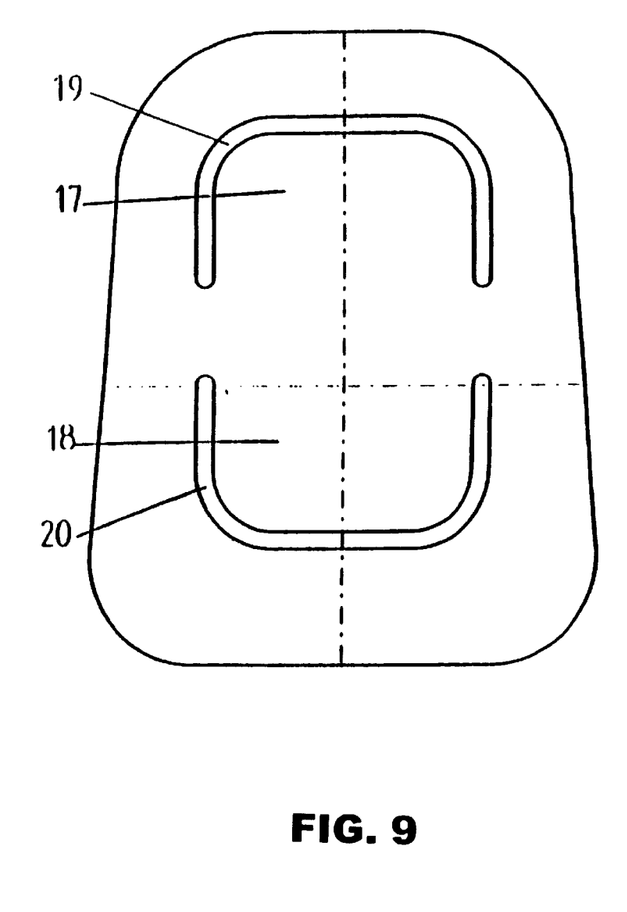

In the embodiment of FIG. 9, two cut-free sections 17, 18 are situated opposite each other. The two cuts are produced by U-shaped slots 19 and 20 extending from the center of the gas bag in the direction of opposite sides. In this embodiment, the gas bag is even more adaptable.

Figure 10:
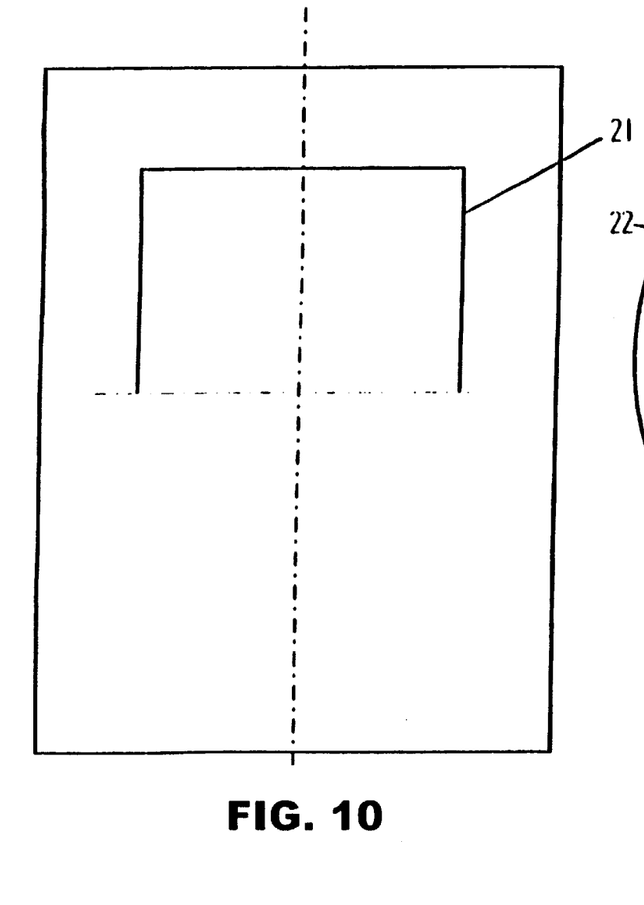
Figure 11:
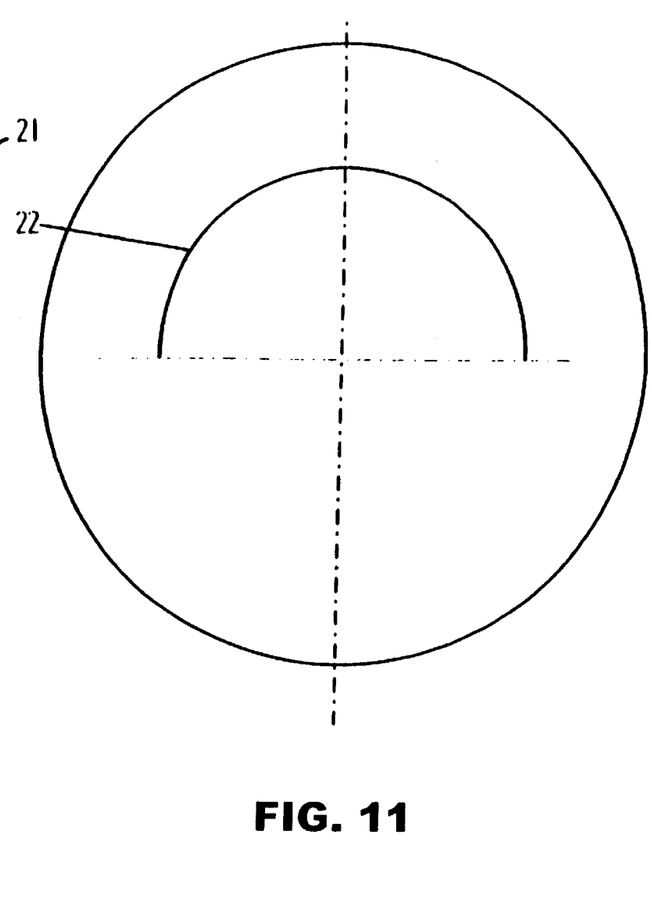
Figures 12, 13:
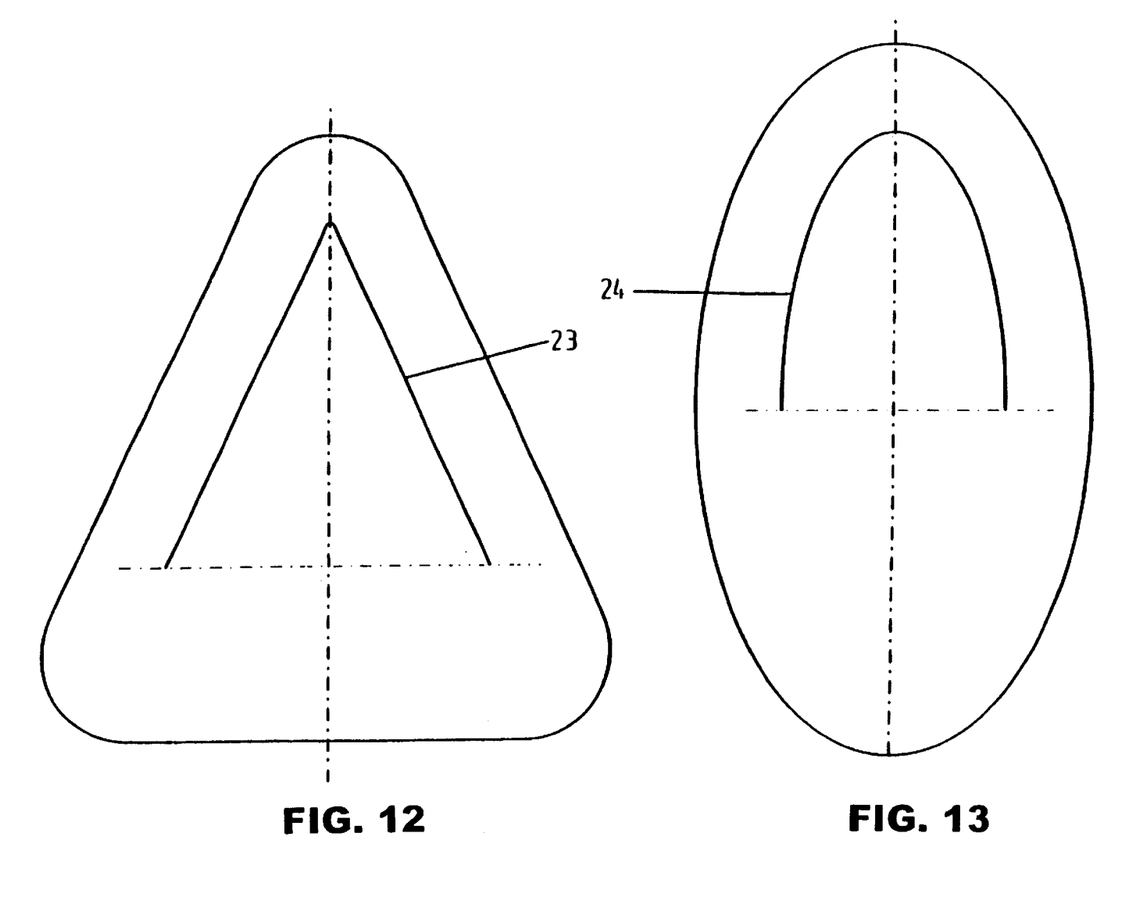

In FIGS. 10–13, different shapes of slots for producing the cut-free section are illustrated in plan views of the enlarged gas bag. In FIG. 10 a rectangular slot 21 is provided, in FIG. 11 a semicircular slot 22 is 30 provided, in FIG. 12 a triangular slot 23 is provided and in FIG. 13 a slot 24 in the shape of a half ellipse is provided. In all of these cases, the slots run parallel to the outer contour of the gas bag, and the gas-bag sections which are adjacent to the cut-free gas-bag sections constitute a frame for the latter. In the event of the passenger striking against the cut-free section of the gas bag, this section is pressed to a certain extent out of the frame.

Figure 14:
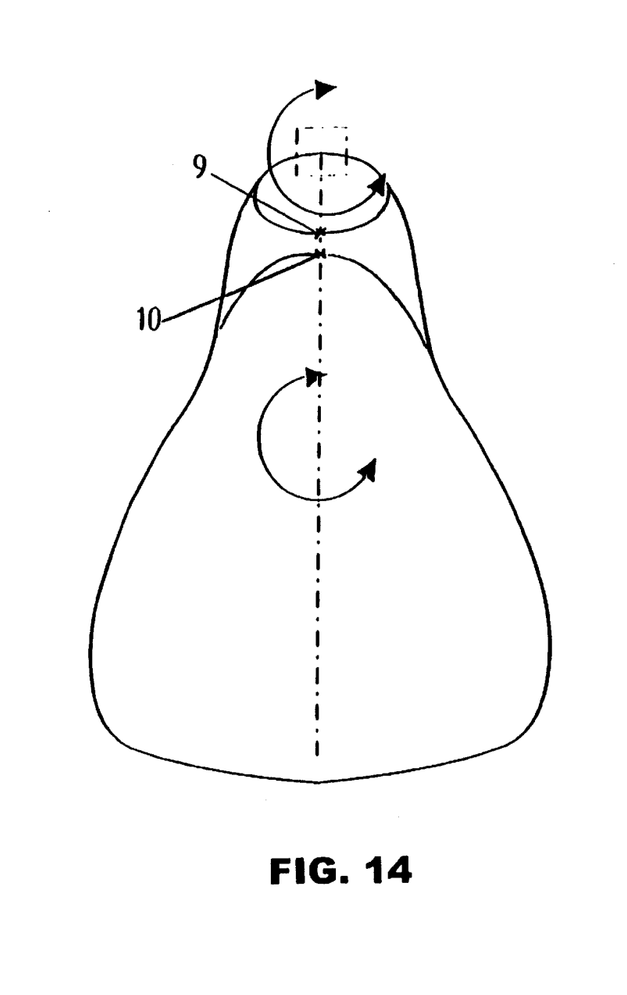
FIG. 14 shows a section through a gas bag, in which the opposite cut edges of the opposite sides of the gas bag are connected directly to each other.
Figure 15:
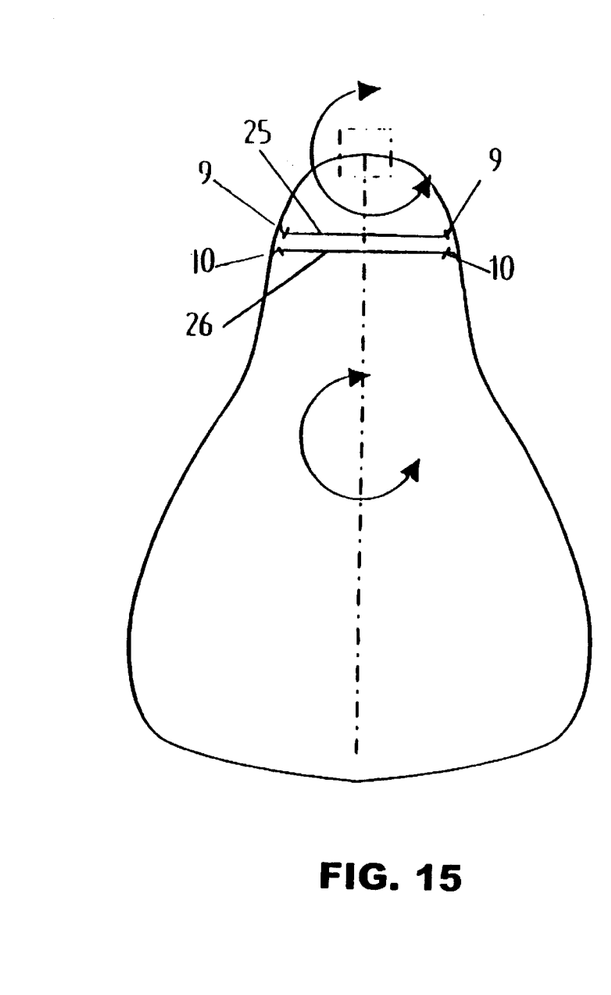
FIG. 15 shows a section through a gas bag, in which an additional gas-bag part is provided between the opposite cut edges of the opposite sides of the gas bag.

In the exemplary embodiment of FIG. 14, the cut edges 9 and 10 of the upper and lower plates, respectively, are sewn directly to each other. As a result, when the gas bag is deployed, the outer contour is pulled strongly inward compared to the remaining gas-bag regions. In contrast, in the embodiment of FIG. 15, there are inserted between the opposite edges 9 and 10 gas-bag parts 25, 26, respectively, of a sufficient width that the outer contour essentially corresponds to the outer contour of the remaining regions of the gas bag. Lying between these two extreme cases is the exemplary embodiment of FIG. 4, in which gas-bag parts 11 of smaller width have been inserted between the cut edges.

What is claimed is:

1. A gas bag for an airbag module comprising two opposite sides, an outer contour and a plurality of sections, wherein one of the plurality of sections is cut-free and is movable independently of an adjacent section of the gas-bag, the cut-free section being made by cutting through both sides, wherein at least one cut runs in the form of a slot through the opposite sides of the gas bag, and further wherein the edges of each cut on the opposite sides are connected to each other in a gas-tight manner, the cut-free section further being situated at least partly within the outer contour of the gas bag, and being of such a size and shape that the adjacent gas-bag section constitutes a frame for the cut-free gas-bag section.

2. A gas bag according to claim 1, wherein the gas bag is deployable and has a region assigned to the head of a passenger, and wherein the cut-free gas-bag section is located in the region of the gas-bag which is assigned to the head of the passenger in the deployed gas bag.

3. A gas bag according to claim 1 or 2 further comprising a region capable of connection to a gas generator, wherein the cut-free gas-bag section is situated in the region of the connection of the gas bag to the gas generator.

4. A gas bag according to claim 1 wherein the edges of each cut on opposite sides are connected by at least one additional gas-bag part.

5. A gas bag according to claim 1 wherein the gas bag is composed of an upper part and a lower part, both parts having an identical slot profile.

6. A gas bag according to claim 1 wherein the slot runs in one of a curved or angular manner.

7. A gas bag according to claim 1 herein the slot runs in the shape of a U.

8. A gas bag according to claim 1 wherein the slot has two ends, and the two ends of the slot are situated within the gas-bag outer contour.

9. A gas bag according to claim 1 further comprising two slots, each slot having two ends, wherein the slots are, situated opposite each other with their ends spaced apart.

10. A gas bag according to claim 1, wherein the slot has two ends, arid at least one end of the slot extends to the outer contour of gas-bag.

11. A gas bag according to claim 1 wherein both the slot and the outer contour of the gas bag have a profile, and the profile of the slot at least party corresponds to the profile of the outer contour of the gas bag.

12. A gas bag for an airbag module comprising two opposite sides, an outer contour and a plurality of inflatable sections, wherein one of the plurality of sections is cut-free from an adjacent section of the gas-bag and is movable independently of the adjacent section, the cut-free section being made by cutting through both sides, wherein at least one cut runs in the form of a slot through the opposite sides of the gas bag, and further wherein the edges of each cut on the opposite sides are connected to each other in a gas-tight manner, the cut-free section further being situated at least partly within the outer contour of the gas bag, and being of such a size and shape that the adjacent gas-bag section constitutes a frame for the cut-free gas-bag section.

\* \* \* \* \*